Sept. 26, 1950  J. H. KLASEY ET AL  2,523,830
STAPLING MACHINE
Filed Dec. 17, 1947  3 Sheets-Sheet 2
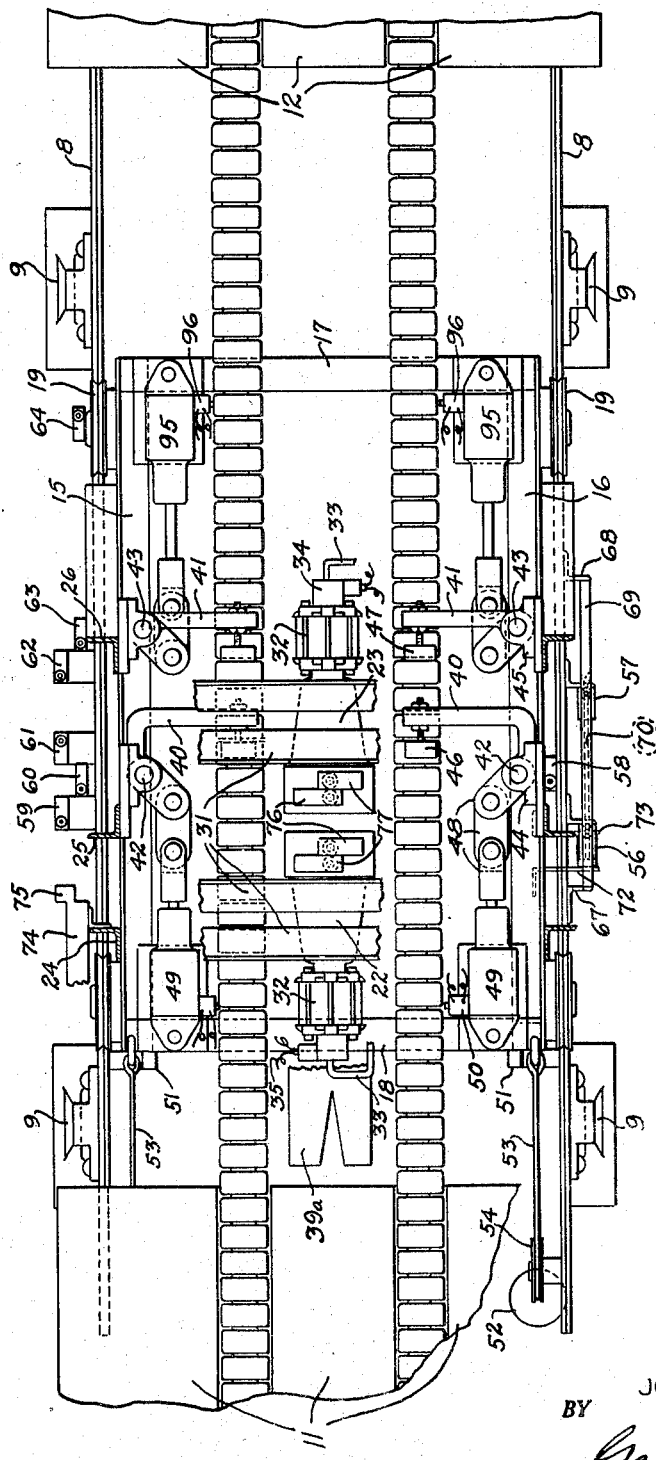
INVENTORS
JOHN H. KLASEY
JOSEPH W. WIEGNER
BRADY E. BARNES
BY George R. Ericson
ATTORNEY

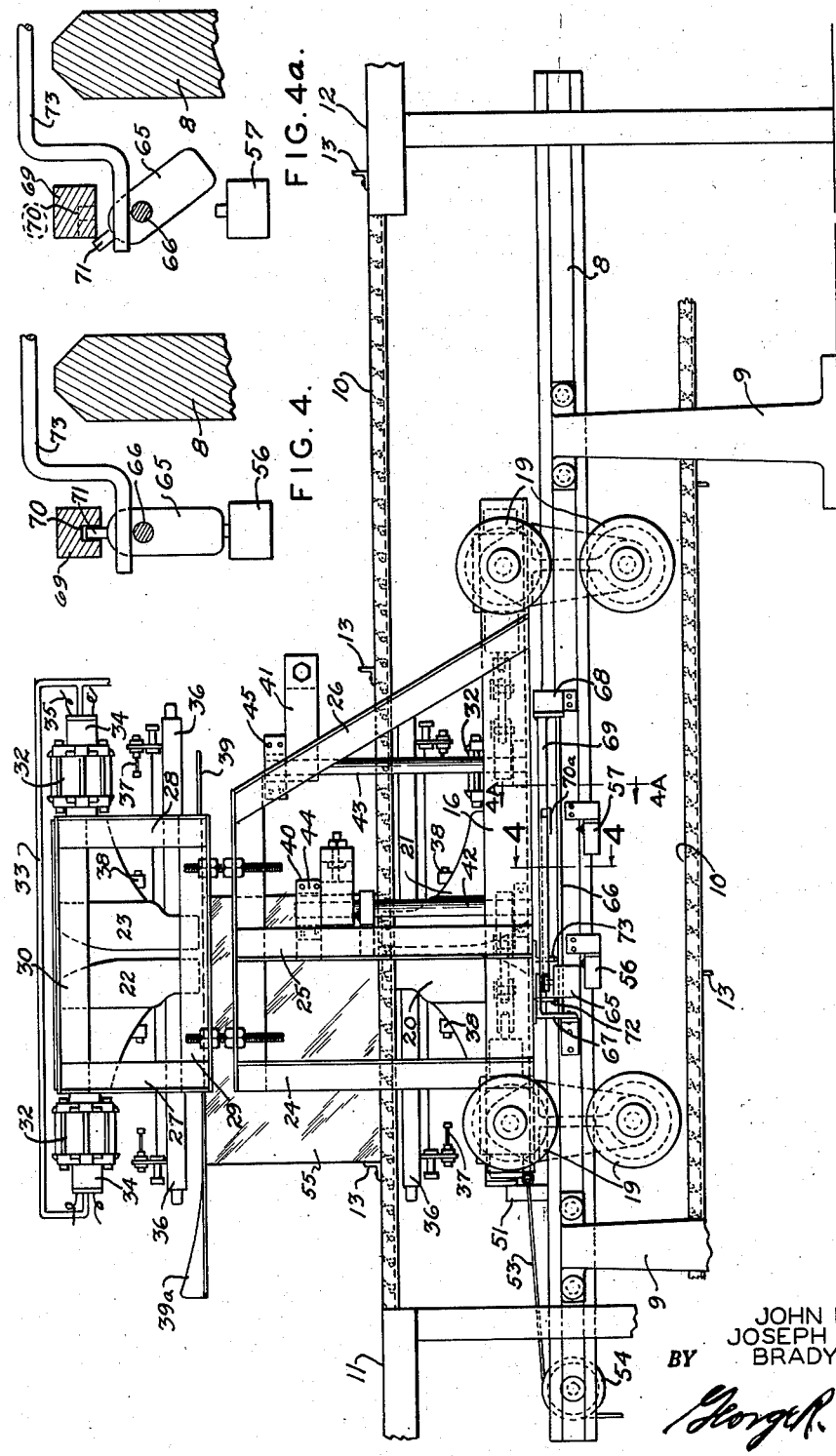

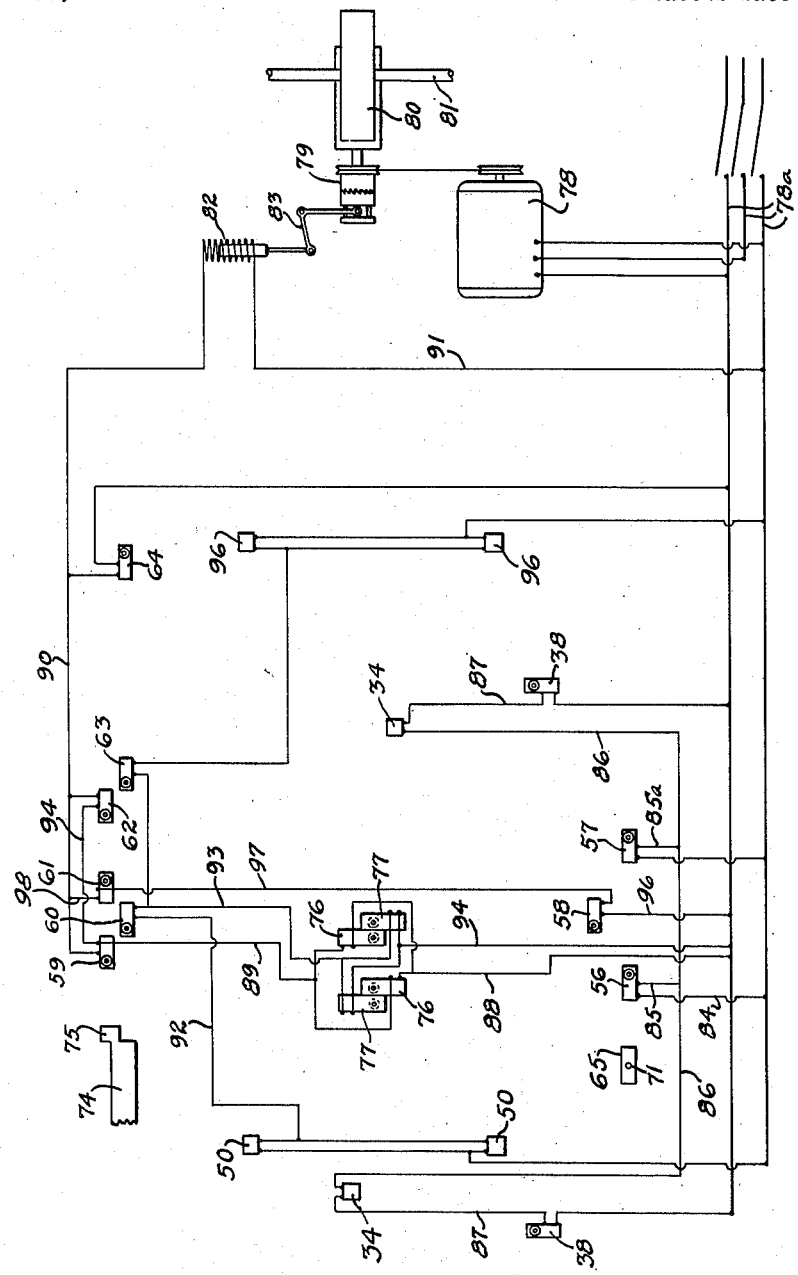

Patented Sept. 26, 1950

2,523,830

UNITED STATES PATENT OFFICE 2,523,830

STAPLING MACHINE

John H. Klasey and Joseph W. Wiegner, St. Louis, and Brady E. Barnes, Jennings, Mo., assignors to Carter Carburetor Corporation, St. Louis, Mo., a corporation of Delaware Application December 17, 1947, Serial No. 792,272

15 Claims. (Cl. 1—11)

This invention relates to stapling apparatus and consists particularly in a novel device adapted to automatically staple, or otherwise secure, containers fed thereto.

Portable stapling devices have been used for fastening the flaps of pasteboard containers. However, such hand stapling operations are tedious and slow. A wholly automatic stapling machine which operates satisfactorily is not available so far as applicant is aware.

Accordingly, it is the main object of the present invention to provide an automatic stapling apparatus including a conveyor for transporting work to be stapled into proximity with the stapling machine, automatic actuating means for the staplers, and various safety appurtenances.

This object and other more detailed objects hereafter appearing are attained by the apparatus illustrated in the accompanying drawings in which:

Fig. 1 is a side view of the apparatus.

Fig. 2 is a top view thereof, portions being broken away for clearer illustration of underlying parts.

Fig. 3 is a wiring diagram of the apparatus.

Figs. 4 and 4a are detail sections, somewhat enlarged, taken on lines 4—4 and 4a—4a of Fig. 1 and showing the switch actuating rocker in different positions.

Fig. 5 is an enlarged bottom view of the guide bar.

The apparatus consists of a pair of horizontally spaced rails 8 of approximately diamond section (see Fig. 4) and supported upon legs 9. A pair of endless conveyor chains 10 are supported on suitable guide wheels (not shown) at opposite ends of the apparatus and provided with a suitable power drive (shown in part in Fig. 3). Apron forming plates 11 and 12 mounted between and on opposite sides of the chains form tables for supporting the work, such as pasteboard containers during application to and removal from the conveyor chains. Angle cleats, as at 13, are provided at intervals on the conveyor chains for carrying along the containers to be stapled.

A carriage, including bottom side rails 15 and 16 and end rails 17 and 18 is carried on rails 8 by means of pairs of sheave wheels 19 mounted at the corners thereof, one wheel of each pair riding above and one below the rail for firm mounting. A pair of lower stapling machines 20 and 21 are mounted on the carriage between the side rails and with their working ends facing upwardly between the conveyor chains. A pair of upper stapling machines 22 and 23 are carried upon a superstructure including upright members 24, 25, and 26 and a superposed frame including vertical bars 27 and 28 and side members 29 and 30. Transverse members 31, shown in part in Fig. 2, connect side members 30 and directly support the upper stapling machines.

The stapling machines may be of well-known, commercial form each including a pneumatic cylinder 32 connected to compressed air piping 33 for operating the stapling arm or hammer. Control valves and operating solenoids therefor are mounted in a casing 34 on each pneumatic cylinder. Control wiring for the solenoids is illustrated at 35. Each machine is provided with a staple magazine 36 carrying an actuator 37 for operating a micro-switch 38.

A horizontal plate 39 extends between bottom side members 29 of the superposed structure and has its left-hand end V-notched, as represented at 39a, with the sides thereof inclined downwardly and outwardly. This portion serves to close the top flaps of a pasteboard box slid thereunder. The plate extends beneath upper stapling machines 22 and 23 and has suitable apertures for receiving staples therethrough to be driven into the container.

Pairs of arms 40 and 41 are pivotally mounted on shafts 42 and 43 carried in brackets 44 and 45 secured to carriage framing members 25 and 26, respectively. These arms project across the conveyor chains and have adjustable contact abutments 46 and 47 to be engaged by a container or other work being carried therealong. Each arm 40 is operated by means of linkage 48 and a pneumatic cylinder 49 having a control valve and operating solenoid therefor mounted in a casing 50. The arms are normally held in the position shown by means of springs (not shown) within the pneumatic housings and may be retracted outwardly and away from the conveyor chains by means of air pressure introduced into the cylinders through piping 33.

The carriage is constantly urged toward its leftward rest position against stops 51 by a pair of weights, one being shown at 52 in Fig. 2, connected to the carriage by means of cables or ropes 53 riding over pulley wheels 54. The carriage is moved in the opposite direction when a container, as at 55, moving along the conveyor chains engages either of the pair of arms 40 or 41.

The carriage and stapling operations are controlled by a series of micro-switches 56, 57, and 58 mounted on or adjacent one rail 8 (Fig. 2) and switches 59, 60, 61, 62, 63, and 64 mounted on or adjacent the other rail 8 (Fig. 2). Switches 56 and 57 are operated by means of a rocker 65 (Figs. 1, 4, and 4a) pivotally mounted on a rod 66 supported from rail 8 by brackets 67 and 68. Also supported by these brackets above the rocker is a flat guide bar or strap 69 having a longitudinal slot 70 in which rides a pin 71 projecting upwardly from the rocker. This slot opens through the outer edge of the bar at a point just to the right of micro-switch 57 (Figs. 1 and 5) where a latch 70a underlies the opening. A pair of angles 72 and 73 projects from bottom rail 19 of the carriage on opposite ends of the rocker so as to slide the same along rod 66 as the carriage advances. Such movement of the rocker will successively close micro-switches 56 and 57. Micro-switch 58 is in position to be actuated by arm 40 when fully opened. Opposite arm 40 may be provided with a similar switch.

The series of switches along the other rail 8 (Fig. 2) are actuated by a block having switch actuating portions 74 and 75 and carried by rear upright framing member 24. Switches 59—64, inclusive, are successively actuated by the block portions during travel of the carriage and function in a manner to be described hereafter. Additional switches 76 and 77 are provided on all the stapling machines for actuation by the stapling arms when in their rest positions. Switches 76 are normally closed and switches 77 are normally open. Corresponding switches are connected together, only the switches on the top staplers being shown.

Fig. 3 shows, in addition to the various switches and wiring, an electric motor 78 connected to a source of electrical energy 78a and, through a clutch 79, to a gear box 80 connected by shafting 81 and other drive elements (not shown) to the conveyor chains. A clutch operating solenoid is shown at 82 connected to one of the clutch elements through a bell crank 83.

In operation, a box laid on the conveyor chains, is picked up by one of the sets of cleats 13 and moved therealong, upper plate 39 automatically closing the top flaps. Ultimately, the box engages the first pair of transverse pivoted arms 40, causing the carriage to move along with the conveyor chain. Almost immediately, rocker 65 closes normally open micro-switch 56 which is connected by a lead 84 to one of the power lines 78a and by a lead 85, 86, to the valve controlling solenoids 34 of all of the stapling machines. The solenoids 34 are connected to power by wires 87 breaking through normally closed staple magazine switches 38. Thus, all of the machines are caused simultaneously to drive staples into the top and bottom of the container.

Rocker 65 holds switch 56 closed for two seconds. During the ensuing two seconds, before switch 56 is opened, the staple arms, if operating normally, will return to their rest positions opening switches 76. After one additional second ensues, portion 75 on the switch actuating block closes normally open switch 59. In case any of the stapler arms has not returned to its rest position, a circuit will be completed through switch 59 and the normally closed micro-switch 76 on the particular stapler through leads 88, 89, 90, and 91 to clutch actuating solenoid 82 so as to open the clutch, stopping the conveyor chains.

However, in case all the staplers operate properly, all switches 76 on the stapling machines will be opened so that clutch 79 will remain engaged. Shortly thereafter, portion 74 of the switch actuating block closes normally open switch 60 which is connected by a lead 92 to valve operating solenoids 50 on pneumatic arm operating cylinders 49. Another wire 93 from switch 60 leads through normally open switches 77 on the stapling machines, thence by wire 94 to power. If all the machines have returned to their rest positions after the stapling operation, a circuit will be completed through switches 60 and 77 to actuate valve controlling solenoids 50 and open arms 40. This permits the carriage to return toward its initial rest position under the influence of weights 52. If one arm 40 has not opened normally closed switch 58, for any reason, when actuator 75 closes switch 61, solenoid 82 will be energized through wires 96, 97, 98, and 90, stopping the conveyor.

However, before the full return of the carriage, and before rocker 65 can ride back over switch 56, the container engages the second pair of pivoted arms 41. This causes the carriage to again move along with the conveyor chains. Shortly thereafter, rocker 65 engages and closes micro-switch 57 which is connected by leads 85a and 86 to the valve controlling solenoids on the stapling machines causing all of these machines to again "shoot" staples into the container. Switch 57 is held closed for two seconds and the ensuing two seconds are allowed for return of the stapling arms. After a further one second interval, portion 75 of the switch actuating block closes switch 62. In case any of the stapler arms has not returned to its rest position, the corresponding safety switch 76 thereon will be closed so as to complete a circuit via wires 88, 89, 94, and 90 to solenoid 82 for opening the clutch. However, in case all of the stapling arms have returned to their rest positions, portion 74 of the switch actuating block closes switch 63 to open arms 41 and release the container by means of pneumatic cylinders 95 and their valve operating solenoids 96. If, for any reason, the arms should not open, portion 74 of the switch actuating block ultimately, will close switch 64 to open the conveyor clutch. When rocker pin 71 emerges from slot 70, latch 70a prevents the pin from re-entering the slot opening. The carriage can then fully return without affecting switches 56 and 57. At the end of the carriage return movement, pin 71 again enters slot 70 through the cut out left hand extremity of the outer wall of bar 69.

This form of apparatus is especially adapted for large containers and a number of stapling positions, determined by the numbers of pairs of arms, such as 40 and 41, may be multiplied, as necessary. The containers may be slid on to the conveyor at plates 11 and withdrawn therefrom at plates 12. The apparatus is fully automatic and has adequate safety provisions. It enables the top and bottom flaps of pasteboard boxes to be stapled much more rapidly and neatly than has been the case heretofore.

The apparatus may be adjusted for different sizes of cartons for instance, by changing the position of arms 40 and 41 or switches 56 and 57. Also, different numbers of staples may be applied to each box as by connecting certain of the switches 56, 57 to actuate, say, only one transverse pair of staplers or, even, only a single machine. These adjustments will be made preparatory to working on a particular box.

The invention may be modified in these and other respects as will occur to those skilled in the art and the exclusive use of all modifications as come within the scope of the appended claims is contemplated.

We claim:

1. Stapling apparatus comprising a guideway, a stapling machine mounted adjacent the same, drive means for producing relative movement between said guideway and said machine for bringing work on said guideway and said machine into operative alignment, means responsive to such movement of the work into alignment with said machine for operating said machine to drive a staple, means responsive to completion of the stapling operation for continuing relative movement of said guideway and said machine, and safety means automatically initiated after a time interval if the stapling operation is not completed to stop said drive means.

2. Stapling apparatus as described in claim 1 in which said drive means includes a clutch and said safety means operates to separate the clutching elements thereof.

3. Stapling apparatus comprising a conveyor, power means for driving the same, a stapling machine movably mounted adjacent said conveyor, a device engageable by work on said conveyor, when moved into operative alignment with said machine, for causing said machine to travel with said conveyor, mechanism responsive to initiation of travel of said machine for causing operation thereof to drive a staple, and means responsive to further travel of said machine and completion of the stapling operation for releasing the work from said device and said machine to permit continued travel of the stapled work on said conveyor.

4. Stapling apparatus as described in claim 3 further including additional means engageable by the work after release thereof from said device to cause further travel of said machine with said conveyor and to produce a second stapling operation upon the work.

5. Stapling apparatus comprising a conveyor, a power drive for the same including clutching elements, a stapling machine movably mounted adjacent said conveyor, a device engageable by work on said conveyor when positioned in operative alignment with said machine for causing travel of said machine with said conveyor, mechanism responsive to the first portion of such travel of said machine for operating said machine to drive a staple, means responsive to further travel of said machine and completion of the stapling cycle of said machine to release the work from said device and said machine and permit continued travel of the work on said conveyor, and safety means energized responsive to still further travel of said machine and upon failure of said machine to complete its stapling cycle for separating said clutching elements to stop said conveyor.

6. Stapling apparatus comprising a stationary support, a conveyor, power means for driving the same, a carriage movably mounted adjacent said conveyor, a stapling machine mounted on said carriage, a control for said machine on said stationary support, and a projection on said carriage for engagement of the work on said conveyor to shift said carriage and cause the same to actuate said control.

7. Apparatus as described in claim 6 in which said power means includes clutch elements and further including a control for said elements on said support and positioned to be actuated by said carriage upon shifting thereof and in case of faulty operation of the apparatus to stop said conveyor.

8. Apparatus as described in claim 6 further including means to withdraw said carriage projection to release the work therefrom and a control on said support engageable by said carriage upon completion of the stapling cycle of said machine to operate said withdrawing means.

9. Stapling apparatus comprising a power conveyor, a carriage movably mounted adjacent said conveyor, a stapling machine carried on said carriage, a plurality of controls for said machine stationarily positioned adjacent said conveyor, an arm pivotally mounted on said carriage, means for urging said arm to a position extending across said conveyor so as to be engaged by work on said conveyor for causing said carriage and machine to travel with said conveyor.

10. Apparatus as described in claim 9 including an additional control for actuation by said carriage to shift said arm and release said carriage from the work and said conveyor.

11. Apparatus as described in claim 9 including an additional control for actuation by said carriage to shift said arm and release said carriage from the work and said conveyor and further including means to return said carriage to its starting position upon release thereof.

12. Apparatus as described in claim 9 including an additional control for actuation by said carriage to shift said arm and release said carriage from the work and said conveyor and means to return said carriage to the starting position upon release thereof from the work and a second pivotally mounted arm on said carriage for engagement by the work after release thereof by said first arm to reinitiate carriage movement and to cause a repeated stapling operation.

13. Stapling apparatus comprising a power conveyor, a carriage movably mounted adjacent said conveyor, a stapling machine mounted on said carriage, means yieldingly maintaining said carriage in a rest position, a plurality of gate arms each pivotally mounted on said carriage and normally projecting across said conveyor to be serially engaged by work on said conveyor to cause said carriage to travel with said conveyor, and controls for said machine and said arms positioned to be actuated by said carriage during its travel to successively and repeatedly operate said machine to drive a staple and open the gate arm engaged by the work.

14. Apparatus as described in claim 13 further including a drive for said conveyor having clutch elements and additional controls actuable in timed relationship by said carriage for opening said clutch elements in case said stapling machine or said arms fail to operate properly.

15. Apparatus as described in claim 13 further including a drive for said conveyor having clutch elements and additional controls actuable in timed relationship by said carriage for opening said clutch elements in case said stapling machine or said arms fail to operate properly and in which said stapling machine, said gate arms, and said clutch elements are provided with operating solenoids and including electrical circuits connecting said controls and said solenoids.

JOHN H. KLASEY.
JOSEPH W. WIEGNER.
BRADY E. BARNES.

REFERENCES CITED

The following references are of record in the file of this patent:

UNITED STATES PATENTS

| Number | Name | Date |
| --- | --- | --- |
| 1,722,952 | Bergstein et al. | July 30, 1929 |
| 2,228,134 | Ecklund | Jan. 7, 1941 |
| 2,380,116 | Lind | July 10, 1945 |
| 2,443,877 | Vacin | June 22, 1948 |